United States Patent [19]

Bowen et al.

[11] 4,044,749
[45] Aug. 30, 1977

[54] CONCRETE REMOVAL TOOL

[75] Inventors: Burlie R. Bowen; Claud C. Barrington; Thomas J. Ames; Glen E. Lochte, all of Houston, Tex.

[73] Assignee: HydroTech International, Inc., Houston, Tex.

[21] Appl. No.: 682,039

[22] Filed: Apr. 30, 1976

[51] Int. Cl.² .................................................. B28D 1/32
[52] U.S. Cl. ...................................... 125/23 R; 138/97
[58] Field of Search ................. 138/97; 125/23 R, 23; 51/73 R, 73 EG, 90, 1

[56] References Cited

U.S. PATENT DOCUMENTS

| | | | |
|---|---|---|---|
| 2,165,118 | 7/1939 | White | 51/90 X |
| 2,657,681 | 11/1953 | Gatzke | 125/23 R |
| 3,727,599 | 4/1973 | Sugiki et al. | 125/23 R |
| 3,933,519 | 1/1976 | Koch et al. | 138/97 |

FOREIGN PATENT DOCUMENTS 655,083  1/1938  Germany .................................. 125/1

*Primary Examiner*—Harold D. Whitehead

[57] ABSTRACT

Method and apparatus for breaking concrete from a concrete coated pipe comprising; a frame mounted on the pipe; means supported by the frame for engaging the concrete to break the concrete from the pipe and means for driving the engaging means against the pipe to impart massive forces thereto exceeding the strength of the concrete to thereby break the concrete from the pipe.

19 Claims, 3 Drawing Figures

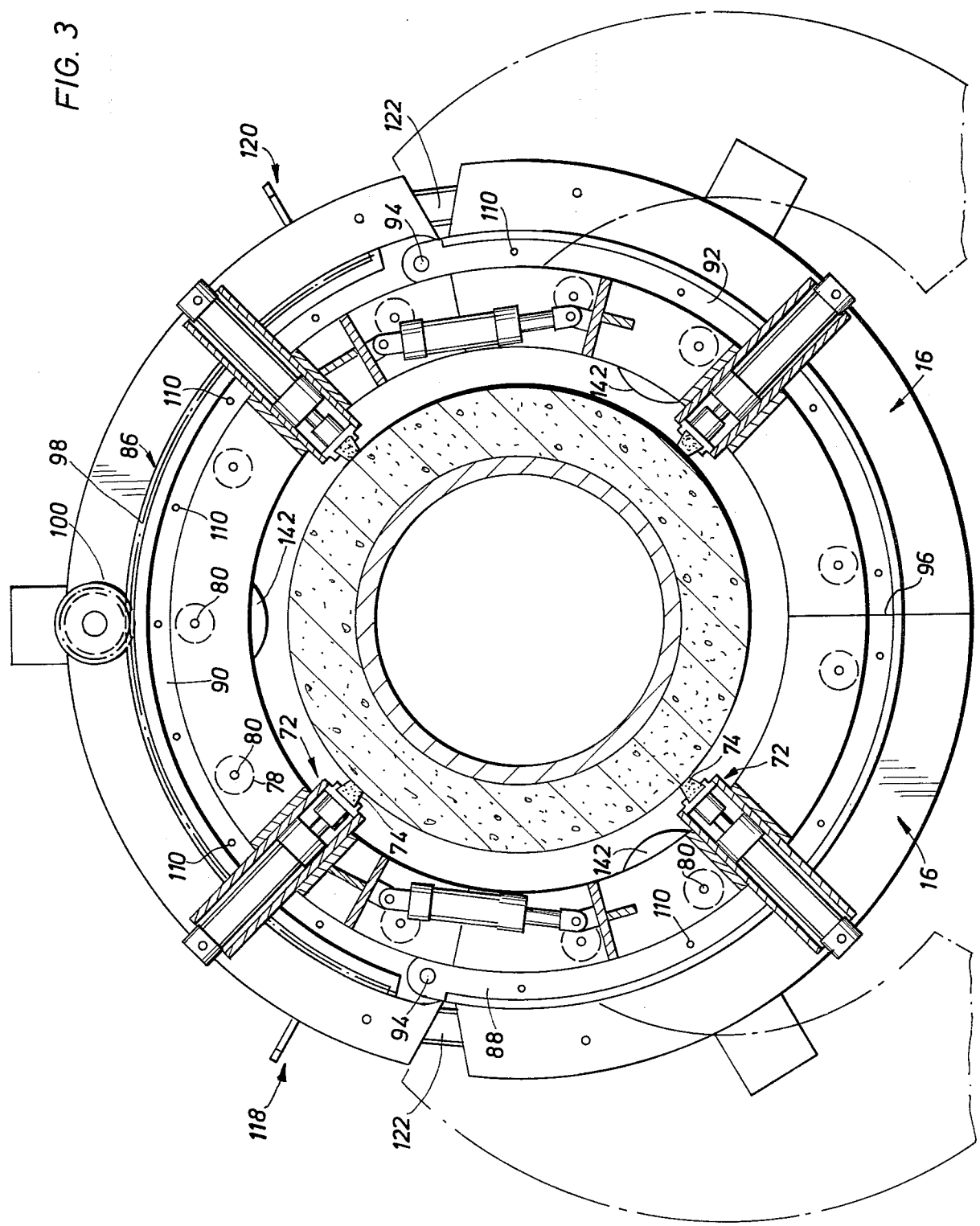

4,044,749

CONCRETE REMOVAL TOOL

BACKGROUND OF THE INVENTION

1. Field of the Invention

This invention relates broadly to method and apparatus for cleaning the exterior surface of a pipe ordinarily located in a sub-sea environment. In particular, the invention has regard to method and apparatus for removing concrete from a pipe precoated with same.

2. Description of the Prior Art

Ordinarily, pipelines laid in a sub-sea environment include a heavy external coating of concrete in order to maintain the pipeline in a submerged condition on sea bottom. Under certain circumstances however, the pipeline may become damaged requiring the damaged section to be cut from and replaced with a new section of pipe. To enable the damaged section to be cut from the pipeline it will be understood that the concrete must first be removed to expose the pipe for cutting purposes.

In one known concrete removal operation, a device having a nozzle is attached to the pipe whereupon the nozzle is moved longitudinally and circumferentially about the pipe to direct a high pressure stream of fluid against the pipe to disintegrate the concrete and remove it therefrom. This operation, however, has one drawback in that very large hydraulic forces are required to obtain the desired pressurized stream characteristics, particularly at great depths. Another drawback is the fact that this concrete removal operation is time consuming because the pressurized stream must contact all areas of the coating in order to disintegrate it.

SUMMARY OF THE INVENTION

Accordingly, it is a broad object of the present invention to provide method and apparatus for removing concrete from a pipe precoated with concrete.

Another object of the present invention is to provide method and apparatus for removing concrete coating from a pipe by imparting massive forces to the concrete exceeding the strength thereof to thereby break the concrete from the pipe.

A related object of the present invention is to provide method and apparatus for removing concrete coating from a pipe by employing a bit to engage the concrete to impart massive forces thereto exceeding the strength of the concrete to thereby break the concrete from the pipe.

To achieve the foregoing and other obvious objects of the invention, both stated and unstated hereinafter, the invention visualizes providing apparatus for breaking concrete from a concrete coated pipe comprising: a frame mounted on the pipe; means supported by the frame for disengageably engaging the concrete to break the concrete from the pipe and means for driving the engaging means against the concrete to impart massive forces thereto exceeding the strength of the concrete to thereby break the concrete from the pipe as aforesaid.

In a correspondingly broad aspect, the invention visualizes method for breaking concrete from a concrete coated pipe comprising the steps of: providing a frame having means for engaging the concrete to break the latter from the pipe; mounting the frame on the pipe with the engaging means being in engagement with the concrete, and driving the engaging means against the concrete to impart massive forces thereto exceeding the strength of the concrete to thereby break the concrete from the pipe.

Other objects of the invention more or less broad than the foregoing will become apparent from the hereinafter following description of the elements, parts and principles of the invention given herein solely by way of example and with reference to the accompanying drawings wherein like reference numerals refer to like parts of the invention.

BRIEF DESCRIPTION OF THE DRAWINGS

FIG. 3 is a rear elevational view taken along lines III—III in FIG. 2.

DESCRIPTION OF THE PREFERRED EMBODIMENT

Figure 1:
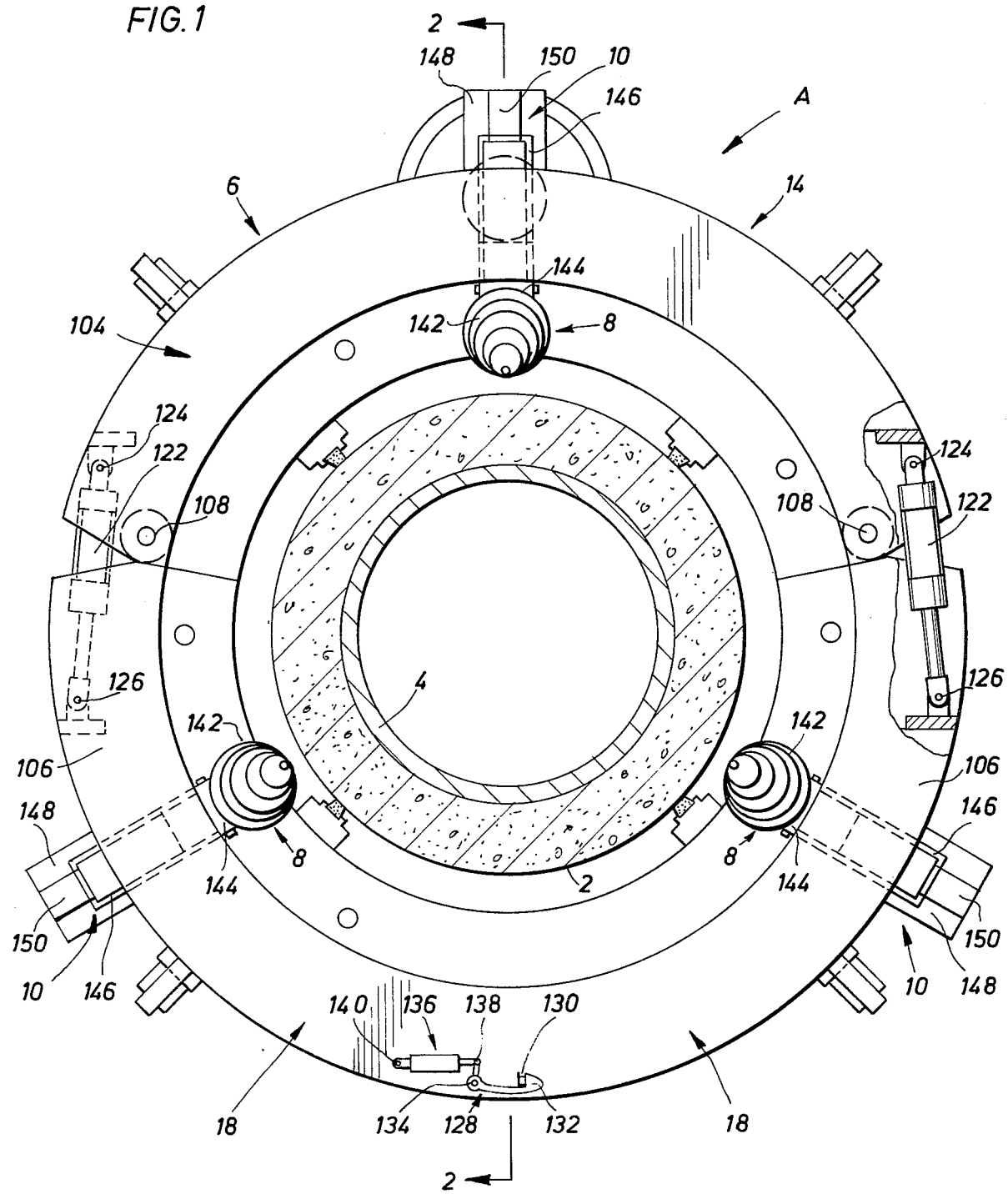
FIG. 1 is a front elevational view of the apparatus for breaing concrete according to the present invention.

The preferred embodiment of the invention as visualized herein is illustrated generally in FIG. 1. As shown therein, apparatus A for breaking concrete 2 from a concrete coated pipe 4 comprises a frame 6 mounted on pipe 4; means 8 supported by frame 6 for disengageably engaging concrete 2 to break it from pipe 4, and means 10 for driving engaging means 8 against concrete 2 to impart massive forces thereto exceeding the strength of concrete 2 to thereby break it from pipe 4 as aforesaid.

More particularly, frame 6 includes a stationary portion 12 (FIG. 2) mounted in fixed relation on pipe 4—i.e., in rigid engagement with concrete coating 2, and movable portion 14 by which engaging means 8 is supported as aforesaid; movable frame portion 14 being connected to stationary frame portion 12 and reciprocally rotatably relative thereto to reciprocally rotate engaging means 8 about pipe 4 and concrete 2 while engaging means 8 is being driven in engagement with concrete 2. That is to say, stationary frame portion 12 and movable frame portion 14 are annularly shaped and include a plurality of jaws 16 and 18, respectively which are movable between a retracted or open position, as exemplified by the phantom lines in FIG. 3, to enable pipe 4 to be received within frame 6 and an extended or closed position, as exemplified by the solid lines appearing in the same view to encircle pipe 4 to enable frame 6 to be mounted thereon as aforesaid. In this embodiment, stationary frame portion 12 includes a forward set of jaws 16 (FIG. 2) and an axially spaced rearward set of jaws 16'. Each forward jaw 16 includes a pair of axially spaced arcuate member 20 and 22 hingedly connected at 24 and 26, to a pair of axially spaced arcuate member 28 and 30 respectively; member 28 and 30 in turn constituting part of a base section 32. Preferably, member 20 and 28 are channel-shaped in cross-section for reasons which will appear. Fixed between member 20 and 22 are beams 34 to add rigidity to jaw 16. In like manner, beams 36 are fixed between members 28 and 30. Each rearward jaw 16' includes a pair of axially spaced arcuate member 38 and 40 hingedly connected at 42 and 44 to a pair of axially spaced arcuate members 46 and 48 respectively; members 46 and 48 in turn constituting part of a base section 32'. Fixed between members 38 and 40 are beams 50 to add rigidity to jaw 16'. In like manner, beams 52 are fixed between members 46 and 48. To produce movement of jaws 16 and 16' between the retracted and extended positions aforesaid, the invention visualizes conventional piston and cylinder assemblies 54 being hingedly attached at one end thereof to base sections 32 and 32' as at 56 and at the other end thereof to jaws 16 and 16' as at 58. It will be understood of course that the energization of piston and cylinder assemblies 54 will be synchronized to effect like movement of jaws 16 and 16' between the extended and retracted positions aforesaid. In order to assemble jaws 16, 16' and base sections 32,32' together to form stationary frame portion 12, the invention contemplates a plurality of props 60 fixed as at 62 to base section 32 and jaws 16 and extending rearwardly therefrom for telescopic movable engagement with bushings 64 on base section 32' and jaws 16'. In addition, a conventional piston and cylinder assembly 66 is attached at one end thereof to base section 32 as at 68 with the other end thereof being attached to base section 32' as at 70; piston and cylinder assembly 66 when energized serving to move base section 32 and jaws 16 axially relative to base section 32' and jaws 16'. Moreover, the invention visualizes stationary frame portion 12 as including means 72 for selectively gripping pipe 4 to mount stationary frame portion 12 in fixed relation thereon as aforesaid. To this end, gripping means 72 includes two sets of pistons or prongs 74, 74', which are radially movable between a retracted position to enable frame 6 to be assembled and disassembled onto pipe 4 and an extended position to engage concrete 2 to fix frame 6 onto pipe 4; prongs 74, 74' being housed preferably in conventional hydraulic cylinders 76 which in turn are fixed to frame 6. Preferably, those cylinders 76 housing prong set 74 are independently actuable relative to those cylinders 76 housing prong set 74'. As a result, prong set 74 can be selectively moved into engagement with concrete 2 while prong set 74' is disengaged therefrom enabling the latter to be moved axially relative to prong set 74 by selectively energizing piston and cylinder assembly 66. Alternately, prong set 74' can be selectively moved into engagement with concrete 2 while prong set 74 is disengaged therefrom enabling the latter to be moved axially relative to prong set 74' by selectively energizing piston and cylinder assembLy 66. It will be understood therefore that such alternate actuation of prong sets 74 and 74' and piston and cylinder assembly 66 will enable frame 6 to be moved axially along pipe 4 when engaging means 8 is disengaged from concrete 2.

It will be recalled that movable frame portion 14 includes a plurality of jaws 18 and is connected to stationary frame portion 12. To this end, the invention visualizes a plurality of rollers 78 journalled in channel-shaped member 20 and 28 as at 80 (FIG. 3); each roller 78 including a rim groove 82 for mating engagement with tongue 84 of circular track 86, the latter being constituted by three arcuate sections 88, 90, 92 hingedly interconnected as at 94—94 as best shown in FIG. 3 with track section 88 and 92 having free terminal ends confronting each other as at 96 when jaws 18 are in the closed position. Of course, it will be understood that hinge points 94—94 are capable of being moved into axial alignment with hinge points 24, 26, 42 and 44 so that jaws 16-16' and jaws 18 can be opened and closed as aforesaid. Track section 90 includes gearing 98 on its outer arcuate rim which is greater than 120° in arcuate length, gearing 98 in turn meshes with a gear 100 extending from a motor 102, the latter being fixed to base sections 32. In addition, movable frame portion 14 includes an arcuate base section 104 hingedly interconnected at opposite ends thereof to arcuate members 106—106 as at 108—108; arcuate members 106—106 having free terminal ends justaposed in the closed position as at 96. Base section 104 and members 106 are of equal arcuate length to the respective axially spaced track sections 90, 88 and 92 whereby hinge points 108—108 are axially aligned with hinge points 94—94. Base section 104 and arcuate members 106 in turn are fixed to track sections 90, 88 and 92, respectively by bolts 110. Accordingly, it will be understood that by selectively operating motor 102 track 86, base section 104 and jaws 18 will be rotated simultaneously such that free terminal ends will travel across the juncture at 96 defined by the terminal ends of channel-shaped members 20 to thereby rotate relative to stationary frame portion 12 about pipe 4. In this embodiment, movable frame portion 14 is reciprocally rotatable through an arc slightly greater than 120° in length. to effect such rotation, a switch 112 having an actuating lever 114 is fixed onto stationary frame portion 12 as at 116; switch 112 when actuated serving to reverse the power to motor 102 and thereby reverse the direction of rotation of gear 110 and movable frame portion 14. To actuate switch 112, movable frame portion 14 includes cam levers 118 and 120 fixed to and spaced apart slightly greater than 120 degrss on base section 104 as shown in FIG. 3, whereby when movable frame portion 14 rotates sufficiently in one direction cam lever 118 will engage switch lever 114 to procure reverse rotation of movable frame portion 14 in the other direction. Thereafter, cam lever 120 will eventually engage switch lever 114 to again procure reverse rotation of movable frame portion 14 and so forth. In order to disassemble frame 6 from pipe 4 it will of course be necessary to stop the rotation of movable frame portion 14 such that jaws 18 are axially aligned with jaws 16. Accordingly, it is contemplated that a conventional pulse generator (not shown) will be connected to gear 100 to send an electrical signal to a readout (not shown) at the sea surface indicating the position and change of position from an index point which in this case may be either of cam levers 118 or 120. An operator being cognizant of this information can than selectively stop motor 102 through appropriate switching when jaws 18 are axially aligned with jaws 16. To open and close jaws 18 and of course track sections 88 and 92 conventional piston and cylinder assemblies 122—122 are hingedly attached at one end thereof to base section 104 as at 124 and at the other end thereof to jaws 18 as at 126; the energization of piston and cylinder assemblies 122 being synchronized with the energization of piston and cylinder assemblies 54 to effect like movement of all jaws between the open and closed positions. It will be recognizaed from FIGS. 1 and 3 that assemblies 122 and 54 are located on opposite sides of the hinge axis for the jaws 16, 16' and 18. thus it will be understood that the pistons in assemblies 122 and 54 will move in opposite directions when energized to open or close the jaws as the case may be. When each set of jaws 18—18, jaws 16—16 and jaws 16'—16' are in the extendéd or closed position aforesaid, a locking mechanism 128 is provided to lock each jaw set together to enhance the integrity of movable frame portion 14 and stationary frame portion 12. To this end, a lug 130 projects from and is fixed to one jaw of each set as shown for example in FIG. 1 with an L-shaped latch 132 being pivotally attached to the other jaw as at 134; latch 132 being pivotally movable between a disengaged position to enable the jaws to be opened and closed as aforesaid and an engaged position to engage lug 130 and thereby lock the jaws together. To effect movement of latch 132 a hydraulic piston and cylinder assembly 136 is pivotally attached at one end thereof to latch 132 as at 138 and at the other end thereof to the jaw as at 140.

Figure 2:
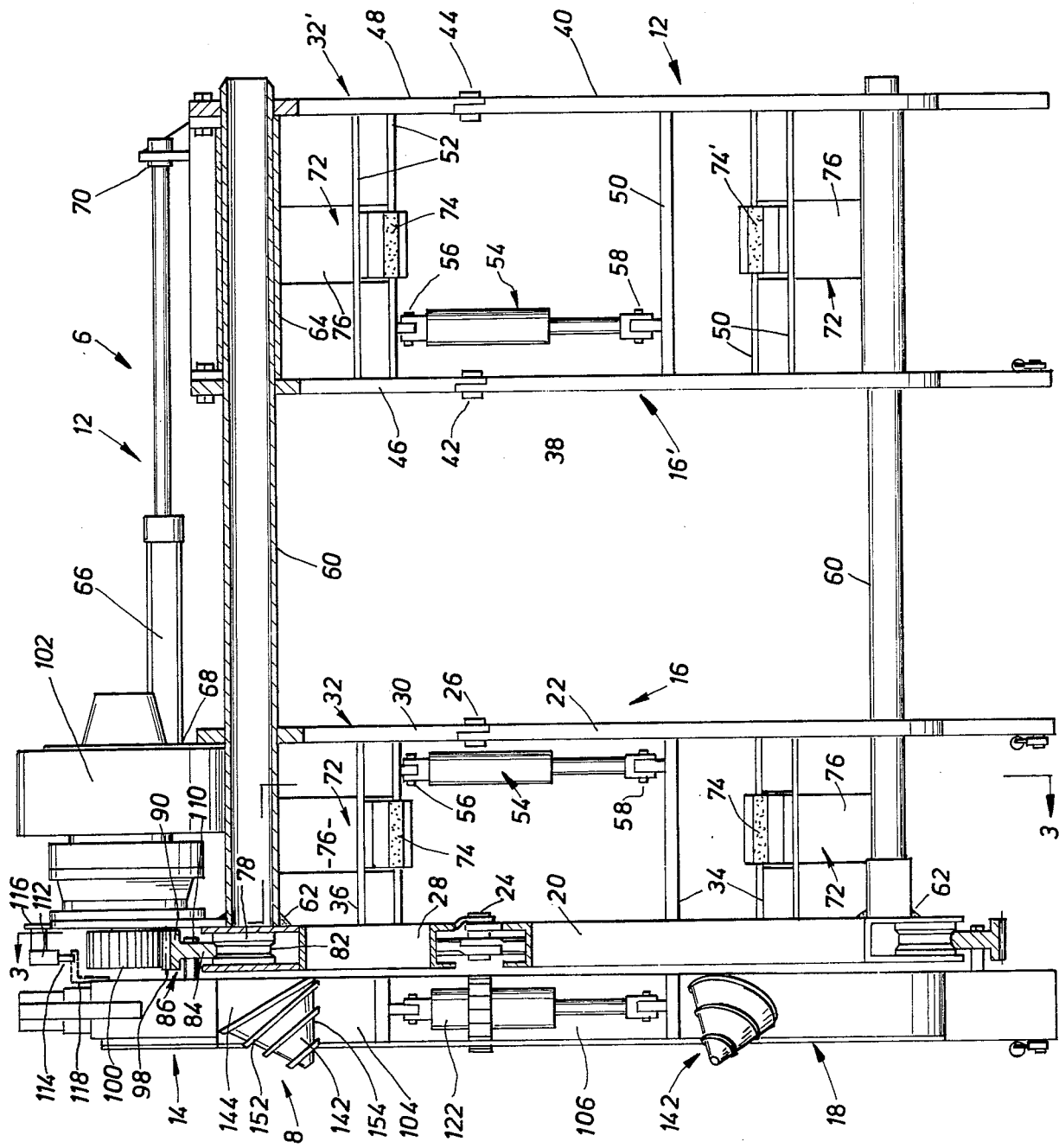
FIG. 2 is a longitudinal cross-sectional view taken along lines II—II in FIG. 1.

With more particular regard now to engaging means 8, the invention visualizes it to include in this embodiment a plurality of conically-shaped bits 142 spaced 120° apart with each being rotatably mounted on a biased support 144, the latter being fixed to the end of a radially oriented hydraulically actuated polygonal barrel 146 mateably and movably housed within a polygonal sleeve 148 which in turn is fixed to movable frame portion 14. A piston 150 is fixed at one end thereof to sleeve 148 with the other end thereof (not shown) being located within barrel 146; piston 150 and barrel 146 constituting drive means 10. Thus it will be understood that bit 142 can be moved between its retracted and extended positions aforesaid by selectively energizing barrel 146 in the known manner. Each bit 142 is formed of a hard material and includes a spiral ridge 152 and is preferably oriented such that a surface 154 thereof is disposed to engage concrete coating 2 in parallel relation as best shown in FIG. 2. Accordingly, it will be understood that drive means 10 can be selectively operated to drive bit 142 between a retracted position to enable frame 6 to be assembled and disassembled onto pipe 4 and an extended position to engage concrete coating 2 to impart massive forces thereto exceeding the strength of the concrete to thereby break concrete coating 2 from pipe 4. That is to say, the invention visualizes drive means 10 driving bit 142 against concrete coating 2 while movable frame portion 14 is reciprocating through an arc greater than 120° such reciprocation serving to rotate bits 142 and enable an overlap in the path traveled on the concrete by adjacent bits 142. It is postulated that bits 142 in being driven radially by drive means 10 and rotated as a result of the movement of movable frame portion 14 impart massive forces to the concrete to break it from pipe 4 usually in large chunks. Depending on the amount of concrete coating 2 to be removed from pipe 4, frame 6 can be moved axially along pipe 4 as aforesaid to reposition bits 142 for reengagement with another section of concrete coating 2. It will be understood within the context to this submission that all piston and cylinder assemblies, motor, controls and so forth will be appropriately connected to adequate power sources.

I claim:

1. Apparatus for breaking concrete from a concrete coated pipe comprising:
   a frame mountable on said pipe;
   bit means rotatably supported by said frame for disengageably engaging said concrete to break said concrete from said pipe,
   means for moving said bit means relative to said pipe;
   and means for simultaneously driving said bit means against said concrete to impart massive force thereto exceeding the strength of said concrete to thereby break said concrete from said pipe as aforesaid.

2. Apparatus for breaking concrete as defined in claim 1 wherein:
   said frame includes a stationary portion mountable in fixed relation on said pipe and a movable portion by which said bit means is supported as aforesaid.

3. Apparatus for breaking concrete as defined in claim 2 wherein:
   said movable frame portion is rotatable relative to said stationary frame portion to rotate said bit means about said pipe and said concrete.

4. Apparatus for breaking concrete as defined in claim 3 wherein:
   said movable frame portion is reciprocally rotatable relative to said stationary frame portion to reciprocally rotate said bit means about said pipe and said concrete.

5. Apparatus for breaking concrete as defined in claim 1 wherein:
   said bit means includes a rolling bit engageable with said concrete.

6. Apparatus for breaking concrete as defined in claim 5 wherein:
   said bit is conically shaped.

7. Apparatus for breaking concrete as defined in claim 6 wherein:
   said conically shaped bit includes a spiral ridge.

8. Apparatus for breaking concrete as defined in claim 6 wherein:
   a surface of said conically shaped bit is disposable to engage said concrete in parallel relation.

9. Apparatus for breaking concrete as defined in claim 3 wherein:
   said driving means includes a piston and cylinder assembly connecting said bit means to said movable frame portion to be supported thereby; said piston and cylinder assembly serving to drive said bit means into engagement with said concrete to impart massive forces thereto exceeding the strength of said concrete to thereby break said concrete from said pipe as aforesaid.

10. Apparatus for breaking concrete as defined in claim 9 wherein:
    said bit means includes at least one rolling bit engageable with said concrete.

11. Apparatus for breaking concrete as defined in claim 10 wherein:
    said bit is conically shaped.

12. Apparatus for breaking concrete as defined in claim 11 wherein:
    said conically shaped bit includes a spiral ridge.

13. Apparatus for breaking concrete as defined in claim 12 wherein:
    a surface of said conically shaped bit and ridge is disposable to engage said concrete in parallel relation.

14. Apparatus for breaking concrete as defined in claim 2 wherein:
    said stationary frame portion includes means for selectively gripping said pipe to mount said stationary frame portion in fixed relation thereon as aforesaid.

15. Apparatus for breaking concrete as defined in claim 14 wherein:
    said gripping means includes two sets of movable prongs with each set being independently actuable and movable axially relative to the other set to selectively move said frame axially along said pipe when said bit means is disengaged from said pipe.

16. Apparatus for breaking concrete as defined in claim 15 wherein:
    each prong is movable radially by a piston and cylinder assembly supported by said stationary frame portion.

17. Apparatus for breaking concrete as defined in claim 2 wherein:

said stationary and movable frame portions are annularly-shaped and include a plurality of jaws movable between a retracted position to enable said pipe to be received within said frame and an extended position to encircle said pipe to enable said frame to be mounted thereon as aforesaid.

18. Apparatus for breaking concrete as defined in claim 17 and further including:
   a locking mechanism for releasably locking said jaws on said movable frame portion.

19. Method for breaking concrete from a concrete-coated pipe comprising the steps of:
   providing a frame having rotatable bit means for engaging said concrete to break the latter from said pipe;
   mounting said frame on said pipe with said bit means being in engagement with said concrete,
   moving said bit means circumferentially and axially relative to said pipe;
   and simultaneously driving said bit means radially against said concrete to impart massive forces thereto exceeding the strength of said concrete to thereby break said concrete from said pipe as aforesaid.

* * * * *